US012682713B2

(12) United States Patent
Padilla et al.

(10) Patent No.: US 12,682,713 B2
(45) Date of Patent: Jul. 14, 2026

(54) FEBRILE PERSON DETECTION DEVICE

(71) Applicants: Jesus Padilla, Moreno Valley, CA (US);
Sandy Padilla, Moreno Valley, CA
(US)

(72) Inventors: Jesus Padilla, Moreno Valley, CA (US);
Sandy Padilla, Moreno Valley, CA
(US)

( * ) Notice: Subject to any disclaimer, the term of this
patent is extended or adjusted under 35
U.S.C. 154(b) by 343 days.

(21) Appl. No.: 18/236,809

(22) Filed: Aug. 22, 2023

(65) Prior Publication Data

US 2025/0069459 A1    Feb. 27, 2025

(51) Int. Cl.
*G07C 9/30* (2020.01)
*G01K 13/20* (2021.01)

(52) U.S. Cl.
CPC ............. *G07C 9/30* (2020.01); *G01K 13/223*
(2021.01)

(58) Field of Classification Search
None
See application file for complete search history.

(56) References Cited

U.S. PATENT DOCUMENTS

| | | |
|---|---|---|
| D297,221 S | 8/1988 | Podhrasky |
| 7,787,663 B2 | 8/2010 | Hartlove |
| 8,282,274 B2 | 10/2012 | Pang |
| 10,422,705 B2 | 9/2019 | Yen |
| 10,502,629 B2 | 12/2019 | Johnson |
| 2007/0153871 A1 | 7/2007 | Fraden |
| 2009/0304041 A1* | 12/2009 | Streicher ................ G01N 25/66 |
| | | 340/604 |
| 2012/0086450 A1* | 4/2012 | Crowley .............. G01N 24/084 |
| | | 324/322 |
| 2015/0182127 A1 | 7/2015 | Heller |
| 2017/0269147 A1* | 9/2017 | Rezgui ................... G01R 15/00 |
| 2021/0304537 A1* | 9/2021 | Reed ...................... G06F 18/22 |

FOREIGN PATENT DOCUMENTS

WO    WO2018031910    2/2018

* cited by examiner

*Primary Examiner* — Erica S Lin

(57) ABSTRACT

A febrile person detection device for screening persons
entering a venue includes a pair of housings, which can be
positioned on a substantially horizontal surface and/or
attached to a pair of substantially vertical elements. Thus
positioned, the pair of housings defines a passageway
through which a person entering a venue must pass. Each of
plurality of sensors, which sense temperature, is attached to
a front of a respective housing. The plurality of sensors is
configured for communicative engagement to a security
system. The sensors are configured to measure a temperature
of the person who is passing through the passageway and to
relay a temperature reading to the security system.

10 Claims, 7 Drawing Sheets

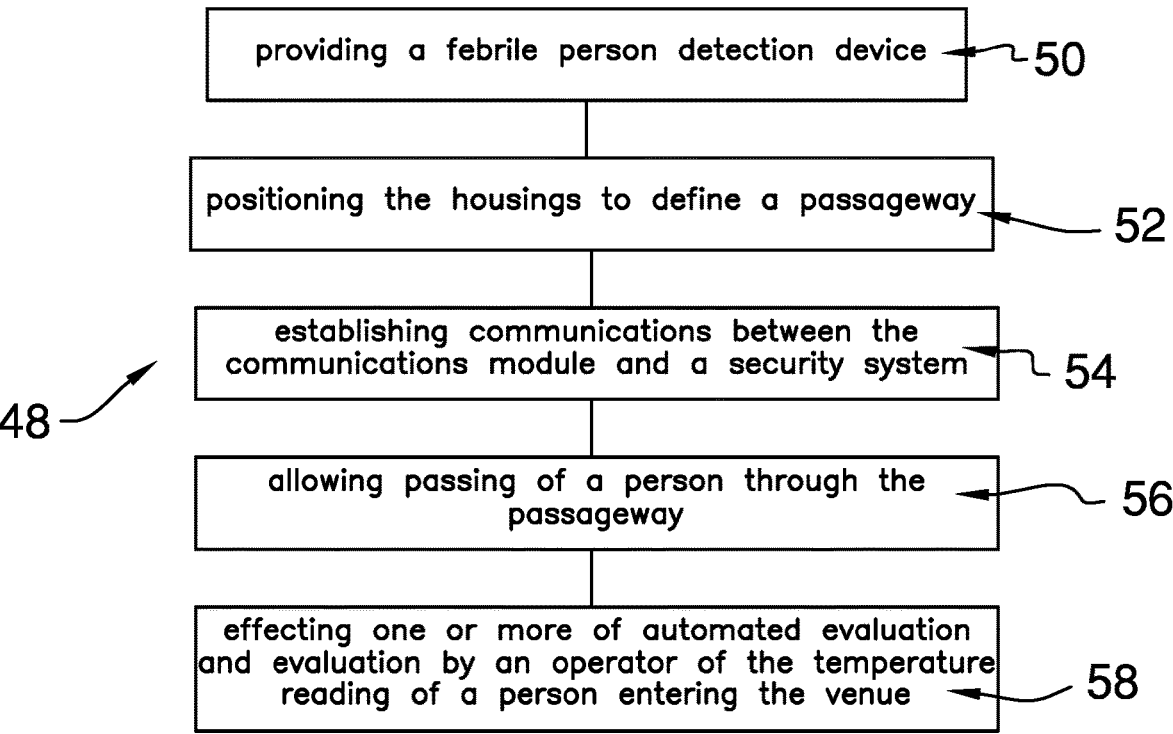

providing a febrile person detection device    50 positioning the housings to define a passageway    52 establishing communications between the communications module and a security system    54

48 allowing passing of a person through the passageway    56 effecting one or more of automated evaluation and evaluation by an operator of the temperature reading of a person entering the venue    58

FIG. 7

FEBRILE PERSON DETECTION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to detection devices and more particularly pertains to a new detection device for screening persons entering a venue. The present invention discloses a detection device for screening febrile persons from a group of persons entering a venue to reduce transmission of communicable diseases.

(2) Description of Related Art Including Information Disclosed Under 37 CFR 1.97 and 1.98

The prior art relates to detection devices, which may comprise thermal imaging devices, infrared sensors that may be controlled to measure facial temperatures, and infrared sensors that sample multiple points on a human. What is lacking in the prior art is a detection device comprising a plurality of infrared sensors positioned on a pair of housings that define a passageway.

BRIEF SUMMARY OF THE INVENTION

An embodiment of the disclosure meets the needs presented above by generally comprising a pair of housings, which is configured for one or more of positioning on a substantially horizontal surface and attachment to a pair of substantially vertical elements. Thus positioned, the pair of housings defines a passageway through which a person entering a venue must pass. Each of plurality of sensors is attached to a front of a respective housing and is configured to sense temperature. The plurality of sensors is configured for communicative engagement to a security system. The sensors are configured to measure a temperature of the person who is passing through the passageway and to relay a temperature reading to the security system.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 7 is a flow diagram for a method utilizing an embodiment of the disclosure.

DETAILED DESCRIPTION OF THE INVENTION

Figure 1:
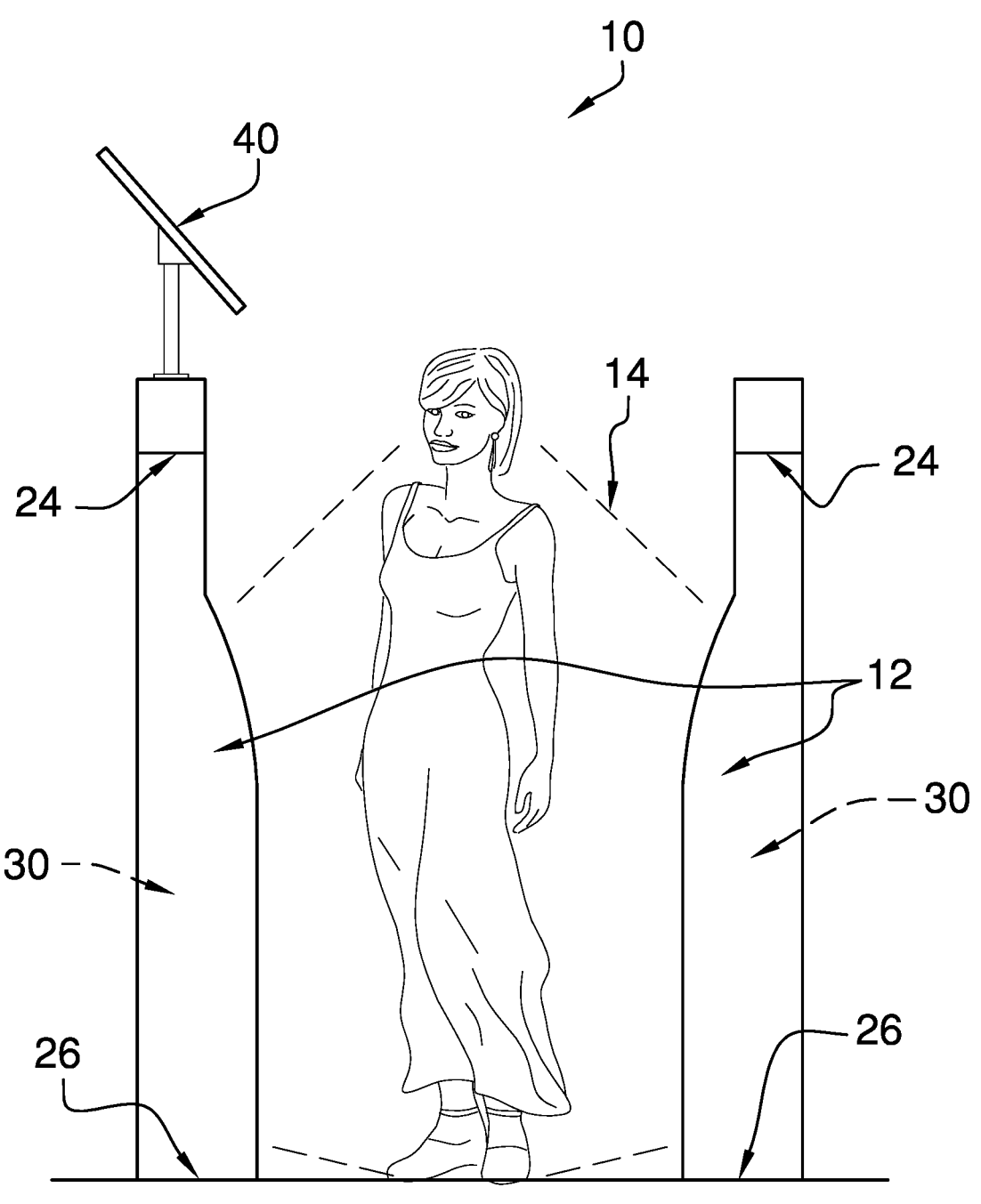
FIG. 1 is an in-use view of a febrile person detection device according to an embodiment of the disclosure.
Figure 2:
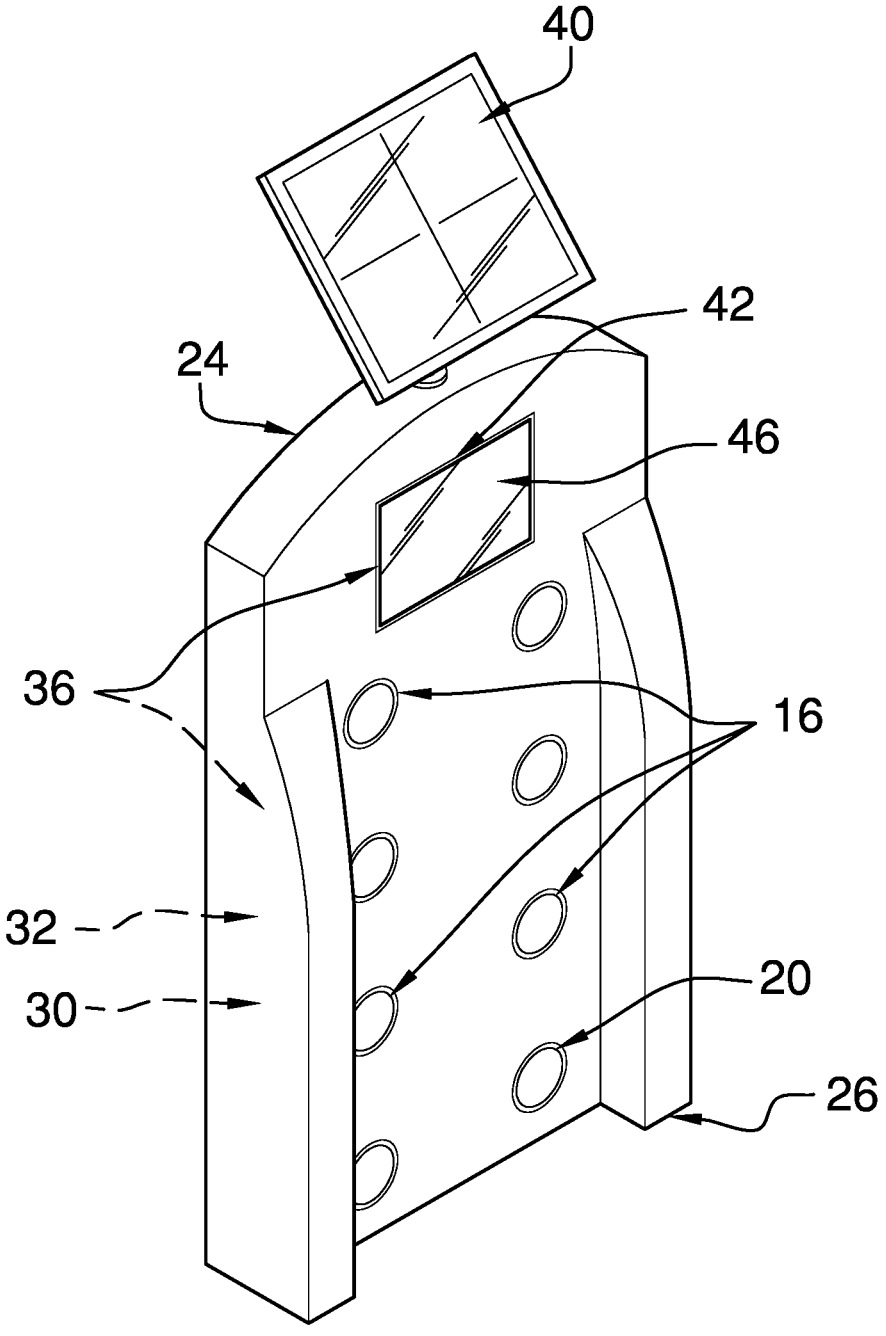
FIG. 2 is an isometric perspective view of an embodiment of the disclosure.

With reference now to the drawings, and in particular to FIGS. 1 through 7 thereof, a new detection device embodying the principles and concepts of an embodiment of the disclosure and generally designated by the reference numeral 10 will be described.

As best illustrated in FIGS. 1 through 7, the febrile person detection device 10 generally comprises a pair of housings 12, which is configured for one or more of positioning on a substantially horizontal surface and attachment to a pair of substantially vertical elements. Thus positioned, the pair of housings 12 defines a passageway 14 through which a person entering a venue must pass, as shown in FIG. 1. Venues in the context of this disclosure should be interpreted to mean buildings, stadiums, arenas, outdoor facilities, and the like.

Figure 3:
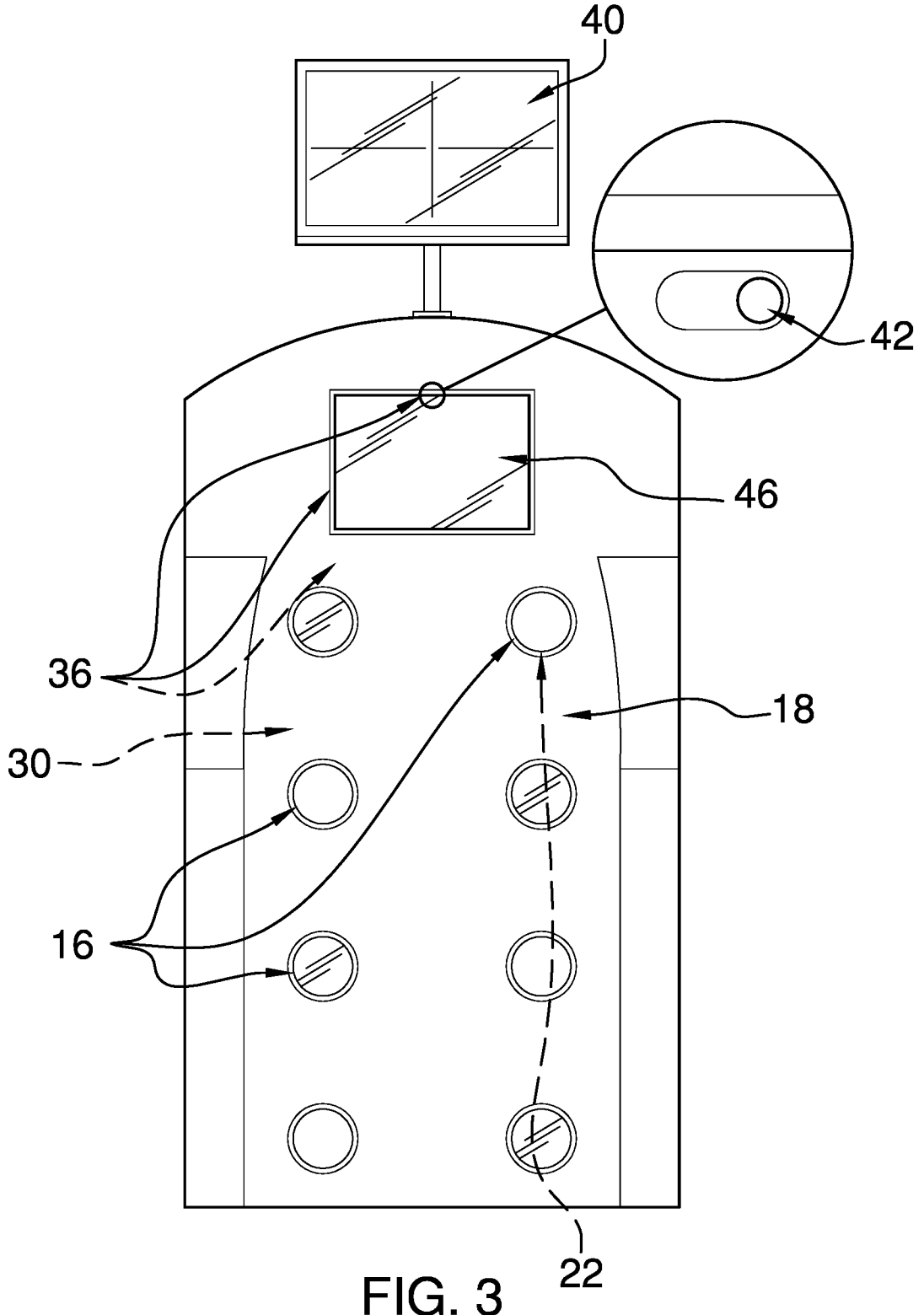
FIG. 3 is a front view of an embodiment of the disclosure.
Figure 4:
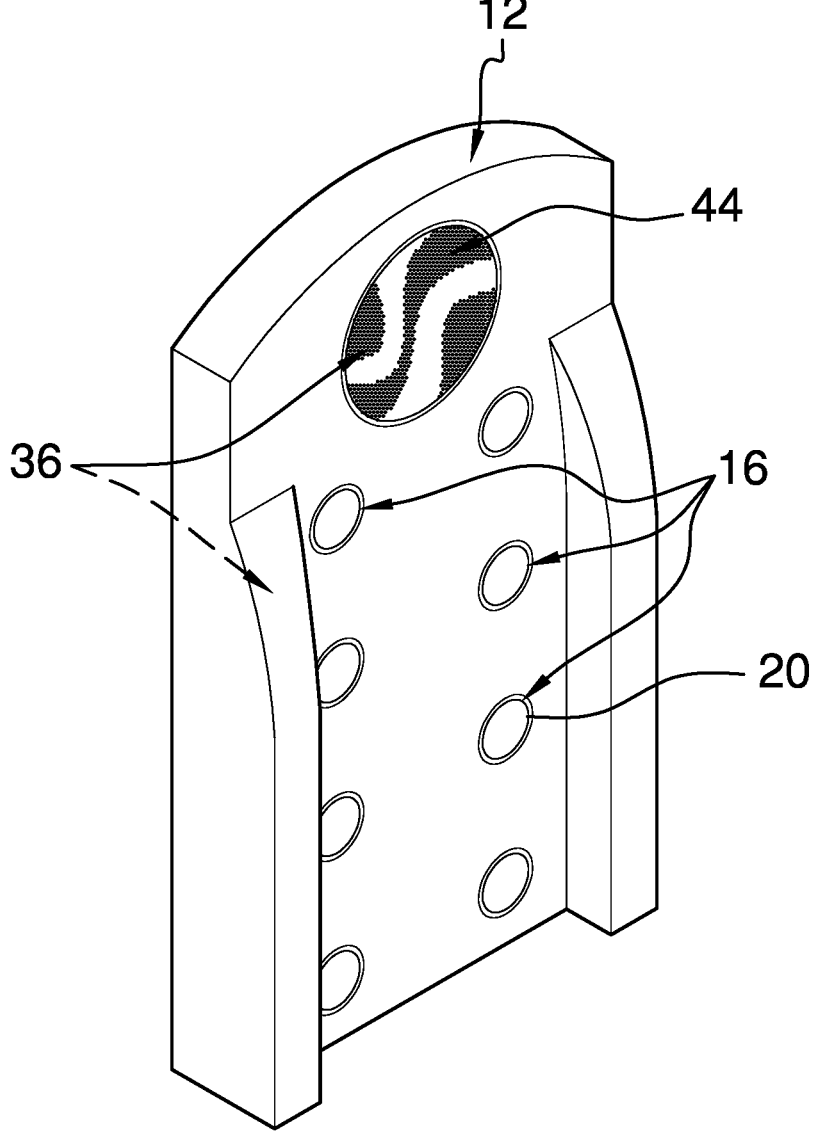
FIG. 4 is an isometric perspective view of an embodiment of the disclosure.
Figure 5:
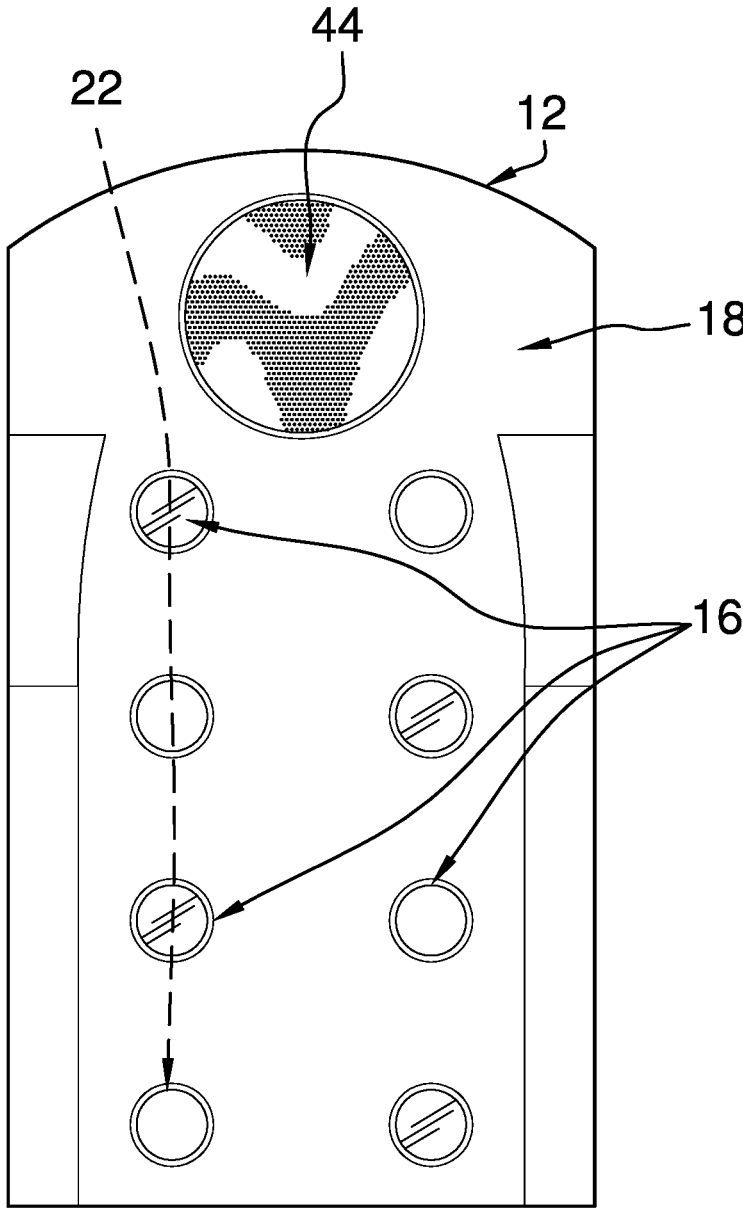
FIG. 5 is a front view of an embodiment of the disclosure.
Figure 6:
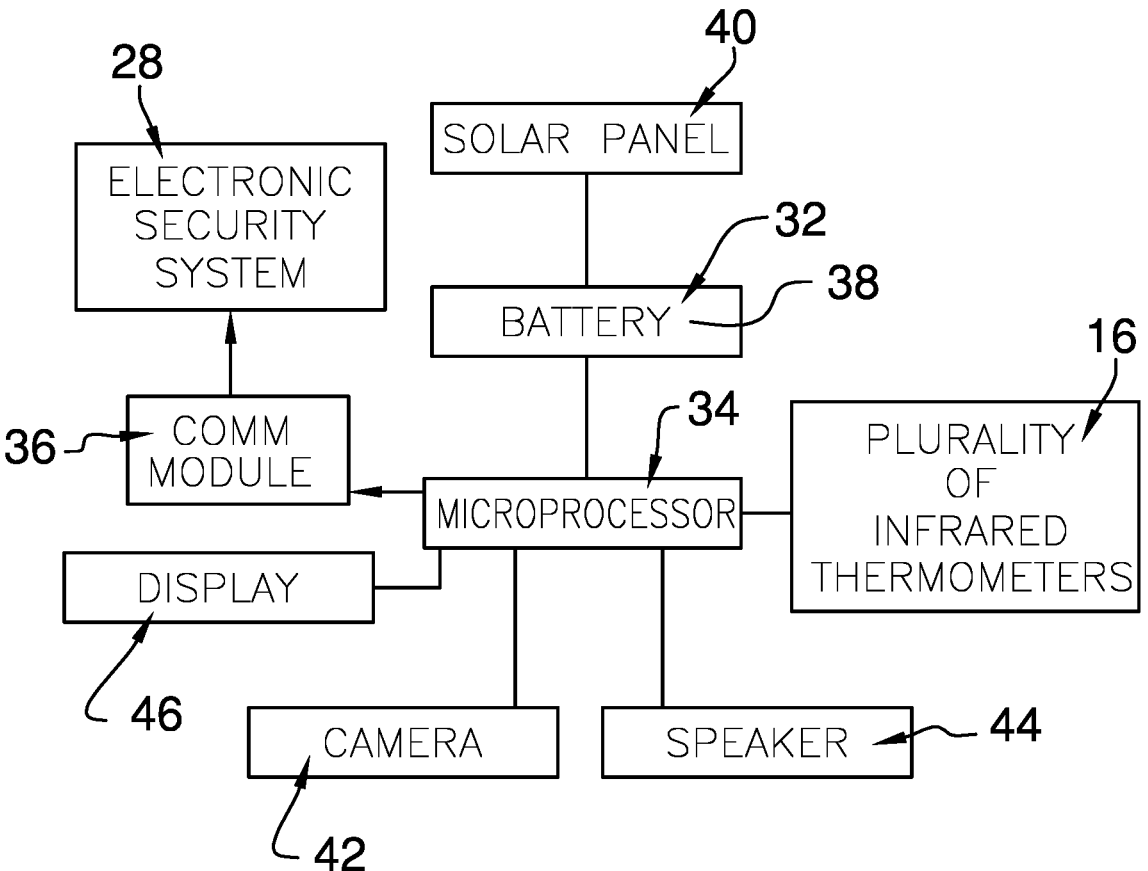
FIG. 6 is a block diagram of an embodiment of the disclosure.

Each of a plurality of sensors 16 is attached to a front 18 of a respective housing 12 and is configured to sense temperature. The sensor 16 comprises an infrared pyrometer 20. The plurality of sensors 16 may comprise sixteen sensors 16, which are positioned eight apiece on each housing 12. The sensors 16 on each housing 12 may be positioned in two rows 22 of four sensors 16, which extend in parallel from proximate to a top 24 to proximate to a bottom 26 of the housing 12, as shown in FIGS. 3 and 5. Thus positioned, the sensors 16 are positioned to detect temperatures at multiple points on the person.

The plurality of sensors 16 is configured for communicative engagement to a security system 28 of the venue. The sensors 16 are configured to measure a temperature of the person who is passing through the passageway 14 and to relay a temperature reading to the security system 28. The present invention is anticipated to be useful in screening febrile persons from a group of persons entering a venue to reduce transmission of communicable diseases.

An electronics module 30 is positioned in and on the pair of housings 12. The electronics module 30 comprises a power module 32, a microprocessor 34, and a communications module 36. The power module 32 may comprise a battery 38, a power cord (not shown), or the like. The battery 38 is rechargeable. The febrile person detection device 10 also may include a solar panel 40, which is attached to the pair of housings 12 and is operationally engaged to the battery 38. The solar panel 40 is configured to convert electromagnetic radiation to an electrical current to charge the battery 38.

The microprocessor 34 is operationally engaged to the power module 32. The communications module 36 is operationally engaged to the microprocessor 34 and is configured to communicate with the security system 28, either by wired or wireless communication means. The communications module 36 is configured to relay the temperature reading of the person from the sensors 16 to the security system 28, whereupon the temperature reading is subjected to one or more of an automated evaluation and evaluation by an operator.

The communications module 36 comprises a camera 42, for capturing an image of the person, a speaker 44, for broadcasting one or more of an automated message and a communication from the operator, and a display 46, for presentation of textual messages and images. As shown in FIGS. 3 and 5, the speaker 44 may be attached to one of the housings 12 with the camera 42 and the display 46 being attached to the other of the housings 12.

In use, the febrile person detection device 10 enables method 48 for detecting a febrile person. The method 48 comprises a first step 50 of providing a febrile person detection device 10 according to the specification above. A second step 52 of the method 48 is positioning the housings 12 to define a passageway 14 through which a person must pass to enter a venue. A third step 54 of the method 48 is establishing communications between the communications module 36 and a security system 28 of the venue. A fourth step 56 of the method 48 is allowing passing of a person through the passageway 14, so that the sensors 16 measure a temperature of the person. A fifth step 58 of the method 48 is effecting one or more of automated evaluation and evaluation by an operator of the temperature reading of a person entering the venue.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A febrile person detection device comprising:
a pair of housings, each of the housings having a respective front and a respective pair of flanges being spaced apart and extending forwardly from opposite edges of the front of the housing defining an inset medial section of the front of the housing, the housings being positionable such that the pair of housings defines a passageway through which a person entering a venue must pass, the front of each housing facing the passageway; and
a plurality of sensors, each sensor being attached to the front of an associated one of the housings on the insert medial section and being configured for sensing temperature, the plurality of sensors being configured for communicative engagement to a security system, wherein the sensors are configured for measuring a temperature of the person passing through the passageway and for relaying a temperature reading to the security system.

2. The febrile person detection device of claim 1, wherein the sensor comprises an infrared pyrometer.

3. The febrile person detection device of claim 1, wherein the plurality of sensors comprises sixteen sensors positioned eight apiece on each housing.

4. The febrile person detection device of claim 3, wherein the sensors on each housing are positioned in two rows of four sensors extending in parallel from proximate to a top to proximate to a bottom of the housing.

5. The febrile person detection device of claim 1, further including an electronics module positioned in and on the pair of housings, the electronics module comprising:
a power module;
a microprocessor operationally engaged to the power module; and
a communications module operationally engaged to the microprocessor and being configured for communicating with the security system, wherein the communications module is configured for relaying the temperature reading of the person from the sensors to the security system for one or more of an automated evaluation and evaluation by an operator.

6. The febrile person detection device of claim 1, further including the communications module comprising:
a camera for capturing an image of the person;
a speaker for broadcasting one or more of an automated message and a communication from the operator; and
a display for presentation of textual messages and images.

7. The febrile person detection device of claim 5, wherein the power module comprises a battery.

8. The febrile person detection device of claim 7, further including:
the battery being rechargeable; and
a solar panel attached to the pair of housings and operationally engaged to the battery, wherein the solar panel is configured for converting electromagnetic radiation to an electrical current for charging the battery.

9. A febrile person detection method, the method comprising the steps of:
providing a febrile person detection device comprising:
a pair of housings, each of the housings having a respective front and a respective pair of flanges being spaced apart and extending forwardly from opposite edges of the front of the housing defining an inset medial section of the front of the housing, the housings being positionable such that the pair of housings defines a passageway through which a person entering a venue must pass, the front of each housing facing the passageway, and a plurality of sensors, each sensor being attached to the front of an associated one of the housings on the insert medial section and being configured for sensing temperature, wherein the sensors are configured for measuring a temperature of the person passing through the passageway and for relaying a temperature reading to the security system, and an electronics module positioned in and on the pair of housings, the electronics module comprising:

a power module, a microprocessor operationally engaged to the power module, and a communications module operationally engaged to the microprocessor and being configured for communicating with a security system, wherein the communications module is configured for relaying the temperature reading of the person from the sensors to the security system for one or more of an automated evaluation and evaluation by an operator;

positioning the housings to define a passageway through which a person entering a venue must pass;

establishing communications between the communications module and a security system;

allowing passing of a person through the passageway, such the sensors measure a temperature of the person; and effecting one or more of automated evaluation and evaluation by an operator of the temperature reading of a person entering the venue.

10. A febrile person detection device comprising:

a pair of housings, each of the housings having a respective front and a respective pair of flanges being spaced apart and extending forwardly from opposite edges of the front of the housing defining an inset medial section of the front of the housing, the housings being positionable such that the pair of housings defines a passageway through which a person entering a venue must pass, the front of each housing facing the passageway;

a plurality of sensors, each sensor being attached to the front of an associated one of the housings on the insert medial section and being configured for sensing temperature, the plurality of sensors being configured for communicative engagement to a security system, wherein the sensors are configured for measuring a temperature of the person passing through the passageway and for relaying a temperature reading to the security system, the sensor comprising an infrared pyrometer, the plurality of sensors comprising sixteen sensors positioned eight apiece on each housing, the sensors on each housing being positioned in two rows of four sensors extending in parallel from proximate to a top to proximate to a bottom of the housing;

an electronics module positioned in and on the pair of housings, the electronics module comprising:

a power module, the power module comprising a battery, the battery being rechargeable, a microprocessor operationally engaged to the power module, a communications module operationally engaged to the microprocessor and being configured for communicating with the security system, wherein the communications module is configured for relaying the temperature reading of the person from the sensors to the security system for one or more of an automated evaluation and evaluation by an operator, the communications module comprising:

a camera for capturing an image of the person, a speaker for broadcasting one or more of an automated message and a communication from the operator, and a display for presentation of textual messages and images; and a solar panel attached to the pair of housings and operationally engaged to the battery, wherein the solar panel is configured for converting electromagnetic radiation to an electrical current for charging the battery.

\* \* \* \* \*